United States Patent [19]
Minissale et al.

[11] Patent Number: 6,075,460
[45] Date of Patent: Jun. 13, 2000

[54] METHOD FOR OPERATING A POWER SLIDING DOOR AND A POWER LIFTGATE USING REMOTE KEYLESS ENTRY SYSTEM

[75] Inventors: Ernest P. Minissale, Novi; William H. Mattingly, Rochester Hills; Patrick D. Dean, Armada; Charles E. Allen, Waterford, all of Mich.

[73] Assignee: Chrysler Corporation, Auburn Hills, Mich.

[21] Appl. No.: 09/163,147

[22] Filed: Sep. 29, 1998

[51] Int. Cl.[7] .............................. G08C 19/00; B60Q 1/00
[52] U.S. Cl. ................ 340/825.69; 340/825.72; 340/425.5; 49/25; 341/176
[58] Field of Search ................ 340/825.69, 825.72, 340/539, 825.22, 825.31, 825.06, 425.5; 318/282, 445; 296/146.1, 146.4, 56; 49/25, 349; 341/176

[56] References Cited

U.S. PATENT DOCUMENTS

| | | | |
|---|---|---|---|
| D. 334,735 | 4/1993 | Cameron et al. | D13/168 |
| D. 360,154 | 7/1995 | Jung | D10/104 |
| D. 375,696 | 11/1996 | Seki et al. | D10/104 |
| D. 380,695 | 7/1997 | Seki et al. | D10/104 |
| D. 383,991 | 9/1997 | Leyden et al. | D10/104 |
| D. 388,349 | 12/1997 | Youabian | D10/104 |
| D. 389,806 | 1/1998 | Nielsen | D13/168 |
| D. 398,588 | 9/1998 | Pinardi et al. | D10/106 |
| D. 406,779 | 3/1999 | Pinardi et al. | D10/104 |
| 4,634,945 | 1/1987 | Takemura et al. | 318/469 |
| 5,155,937 | 10/1992 | Yamagishi et al. | 49/280 |
| 5,220,319 | 6/1993 | Kendel | 340/825.69 |
| 5,263,762 | 11/1993 | Long et al. | 49/280 |
| 5,343,475 | 8/1994 | Matsuda et al. | 370/94.1 |
| 5,379,033 | 1/1995 | Fuji et al. | 340/825.69 |
| 5,525,977 | 6/1996 | Suman | 340/825.25 |
| 5,563,483 | 10/1996 | Kowall et al. | 318/283 |
| 5,627,529 | 5/1997 | Duckworth et al. | 340/825.72 |
| 5,673,017 | 9/1997 | Dery et al. | 340/426 |
| 5,701,418 | 12/1997 | Luitje | 395/421.06 |
| 5,864,297 | 1/1999 | Sollestre et al. | 340/825.31 |
| 5,933,090 | 9/1999 | Christenson | 340/825.69 |

*Primary Examiner*—Donnie L. Crosland
*Attorney, Agent, or Firm*—Mark P. Calcaterra

[57] ABSTRACT

A method for operating a power sliding door and a power liftgate in an automobile, such as a minivan, using a remote keyless entry (RKE) is comprised in a control system that includes a user input interface for receiving sliding door actuation requests from a user. The actuation signals are carried to a body control module (BCM) where the request is broadcast to a power sliding door module (PSDM) over a serial data bus communications network meeting the SAE J1850 multiplex communications protocol standard. Upon receipt of the actuation message the PSDM monitors several operating conditions of the automobile and makes a determination whether or not to carry out the power sliding door activation request. Power sliding door actuation is controlled by the PSDM via electric motors located at or near the power doors. A power liftgate module (PLGM) controls the power liftgate actuation upon via electric motors located at or near the liftgate. The user input interface includes interior switches as well as a RKE system.

17 Claims, 1 Drawing Sheet

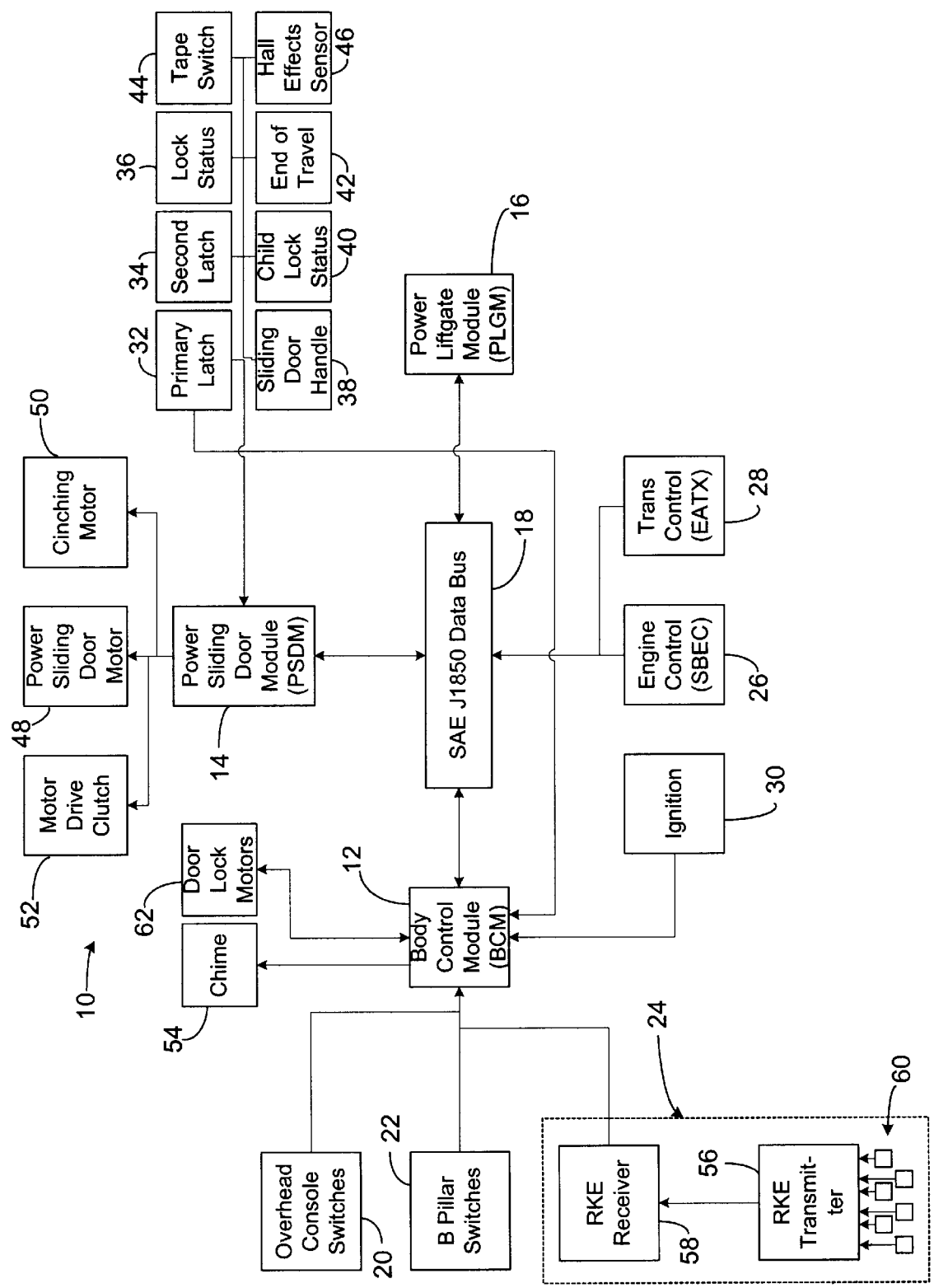

METHOD FOR OPERATING A POWER SLIDING DOOR AND A POWER LIFTGATE USING REMOTE KEYLESS ENTRY SYSTEM

RELATED APPLICATIONS

This application is related to a co-pending U.S. patent application Ser. No. 09/166,029 filed Oct. 5, 1998 and entitled, "Method and Apparatus for Operating a Power Sliding Door in an Automobile."

BACKGROUND OF THE INVENTION

1. Field of the Invention

The present invention relates generally to the remote operation of powered convenience accessories in automobiles, and specifically automobiles having a power sliding door and/or a power liftgate. More particularly, the present invention relates to the method and apparatus for electronically controlling the operation of a power sliding door and/or a power liftgate in a minivan including, in one aspect of the invention, the use of a remote keyless entry system.

2. Discussion

It is well-known that electronics have been employed in automobiles to encompass a wide variety of automotive systems and accessories. In today's automobiles, electronically controlled convenience accessories such as power operated central locking systems for doors, trunk and gas tank cap, power adjustable seats and steering wheels, power windows and doors and theft deterrent devices, among others, are commonplace.

Electronic control systems routinely employ microcontrollers and/or microprocessors that are programmed to interact with a variety of sensors and actuators to sense, measure, monitor and control nearly every functional aspect of automobile operation. Often, several or more control systems combine together to comprise a single vehicle electrical system and each control system is interdependent upon one or more others for data or performance in order to accomplish its tasks and objectives. As such, the control systems are designed to share data with one another, as necessary, across one or more communication interfaces within the vehicle electrical system. For reasons of design cost, complexity, reliability and functionality, as new control systems are subsequently introduced into a vehicle electrical system, it is desirable to minimize the additional circuitry and programming that is required to implement the new control system.

Among automobiles today, minivans enjoy a sustained popularity in the marketplace, and have done so since their introduction in the early 1980's. Minivans often include one or more sliding doors, as well as a rear liftgate for access to the vehicle.

It has become desirable to employ a power convenience device for automatically operating (e.g., opening and closing) the sliding doors and liftgates of minivans in order to avoid having the vehicle users manually open and close these heavy doors.

Thus, a primary objective of the present invention is to provide a power convenience device which substitutes for the use of physical effort on the part of the automobile user to open and close a sliding door or liftgate of a minivan.

Another objective of the present invention is to provide an electronic control system for operating power sliding doors and/or a power liftgate in a minivan with a minimal amount of electrical circuitry being added to the overall vehicle electrical system and which can take advantage of controllers, switch inputs and an SAE Standard data bus already hardwired within an automobile.

In addition, another objective of the invention is to accommodate the monitoring of multiple inputs for the same function by a body control module and subsequently broadcasting the information over a standard data bus to a control module controlling the operation of the sliding door or liftgate.

Still another objective of the present invention is to provide a remote keyless entry (RKE) system as a user input interface to a power sliding door or liftgate control system which enables a sliding door or liftgate to be opened remotely using a remote keyless entry device. A further objective of the present invention is to provide such a remote keyless entry system that allows a single RKE user input device, such as a key fob, to be utilized for a variety of combinations of power door and liftgate options that may be incorporated in a minivan.

SUMMARY OF THE INVENTION

Accordingly, the present invention is directed to a method for operating a power sliding door and/or power liftgate in an automobile. An electronic control system includes a user input interface for receiving sliding door actuation requests from a user. The actuation signals are carried to a body control module (BCM) where the request is broadcast to a power sliding door module (PSDM) or a power liftgate module (PLGM) over a serial data bus communications network meeting the SAE J1850 multiplex communications protocol standard. Upon receipt of the actuation message the control modules monitor several operating conditions of the automobile and make a determination whether or not to carry out the activation request. Power sliding door actuation is controlled by the PSDM via electric motors located at or near the power doors. Power liftgate actuation is controlled by the PLGM via electric motors located at or near the liftgate. The user input interface includes interior switches as well as a RKE system.

One advantage of the present invention is the ability to incorporate a power sliding door or liftgate control system in an automobile with a minimal amount of electrical circuitry thereby reducing packaging size and costs.

This invention also has the advantage of being able to both unlock and open a door with the single push of one button from outside the vehicle.

This invention also has the advantage of using only one key fob for an RKE user interface regardless of how many power door and/or liftgate features are included on the vehicle.

Various other features and advantages will become apparent to one skilled in the art after having the benefit of studying the teachings of the specification, the drawings, and the claims.

BRIEF DESCRIPTION OF THE DRAWINGS

The various features and advantages of the present invention will become apparent to one skilled in the art upon reading the following specification, in which:

The drawing is a simplified block diagram of an electronic control system of the present invention for operation of power doors and/or a liftgate in an automobile.

DESCRIPTION OF THE PREFERRED EMBODIMENT

It should be understood from the outset that while the drawings and following discussion relate to a particular embodiment of the present invention, this embodiment merely represents what is presently regarded as the best mode of practicing the invention and other modifications may be made to the particular embodiment without departing from the spirit and scope of the invention.

Referring to the drawing, a simplified block diagram of an electronic control system 10 of the present invention for operation of power doors and/or a liftgate in an automobile, such as a minivan or the like, is illustrated. As is well-known, minivans can include either one or two side sliding doors (e.g. a driver's side and/or a passenger's side) and a rear liftgate. Also, interior overhead consoles in minivans are common which house electronic switches that are easily accessed by the vehicle occupants to actuate vehicle accessories. Additionally, user-actuated switches are located on the B-pillar of the vehicle, that is, a roof structural support member that is located between the front and rear passenger compartments.

A power sliding door control system 10 as embodied in the present invention is one part of the complete vehicle electrical system (not shown) which generally includes numerous electrical feeds, output loads, sensors and control modules. Consequently, in order for the control system 10 of the present invention to operate as intended, all the related components in the vehicle electrical system must provide accurate information, as necessary, for satisfying the logical functional parameters required for carrying out a user's request for a power sliding door operation.

The control system 10 controls the operations of opening and closing of a power sliding door or power liftgate convenience accessories by directing the function of the several sliding door motors within the vehicle. Also, the control system 10 provides the vehicle occupants with audible warning signals, either preceding or simultaneous with carrying out the sliding door activation requests by the user(s).

The control system 10 is shown in the drawing to comprise several control modules including a body control module (BCM) 12, a power sliding door module (PSDM) 14 and a power liftgate module (PLGM) 16. The control modules 12, 14, 16 are either microcontroller or microprocessor-based, the PSDM 14 being microprocessor-based with a suitable processor being from the MC68HC08 family of microprocessors manufactured by Motorola. The control modules 12, 14, 16 communicate with each other over an electronic serial data bus communications network 18, such as the Society of Automotive Engineers (SAE) multiplex (MUX) protocol standard J1850. The modules 12, 14, 16 can receive switch inputs and sensor information, as well as control motors to various components of the vehicle.

Additionally, the control system 10 includes a plurality of input actuation devices for the power doors and/or liftgate. Diagrammatically illustrated in the drawing are overhead console switches 20, B-pillar switches 22 as well as a remote keyless entry (RKE) system 24. The switches 20, 22 and RKE system 24 are operable in response to user inputs for activation of the power door or liftgate vehicle accessories.

According to the present invention, function of the power door and/or liftgate features is also contingent upon inputs from several other control modules and switches not directly part of the control system 10. For example, also broadcasting information to the control system across the SAE J1850 data bus are a single board engine controller (SBEC) 26, an electronic automatic transmission controller (EATX) 28 and an ignition switch 30.

Further, a plurality of switches and sensors, including a primary latch switch 32, a secondary latch switch 34, a lock status switch 36, a sliding door handle switch 38, a child lock status switch 40, an end of travel switch 42, a tape switch 44 and a Hall effects sensor 46 communicate information to the PSDM 14 that is determinative of accessory operability.

In regard to the present invention, the BCM 12 monitors for user activation requests for the power door and/or liftgate accessories from the RKE system 24, the overhead console switches 20 and the B-pillar switches 22. In addition, the BCM 12 is able to receive and monitor broadcasts from the SBEC 26 and EATX 28.

According to the method of the present invention, certain conditions are required to be satisfied for the BCM 12 to make a determination to send activation messages to the PSDM 14 over the J1850 data bus 18. The BCM 12 provides J1850 data bus 18 messages to various control modules in the vehicle electronics system, including the PSDM 14 and PLGM 16, as necessary in response to power accessory activation requests from the user. The BCM 12 sends information, such as switch status, and inputs, such as power sliding door activation requests from the overhead console switches 20, the B-pillar switches 22, and the RKE system 24, to the PSDM 14.

The BCM 12 also operates a chime 54 of three single tones when a successful J1850 data bus 18 broadcast by the BCM 12 of an interior switch button press has been communicated to the PSDM 14.

In order to eliminate ignition-off-draw, the BCM 12 provides a wake-up ground signal to the PSDM 14. During low power mode, the BCM 12 periodically wakes-up and monitors for a newly active input. Upon a new signal being sensed, the BCM 12 exits its low power "sleep" state and enters its normal "awake" state. When the BCM 12 is awakened, the BCM 12, in turn, wakes up the PSDM 14. However, the BCM 12 will not wake up as a result of any message from of the interior switches (e.g., the overhead console switches 20 and the B-pillar switches 22) after a 5 minute "timeout" period has elapsed subsequent to the vehicle ignition being cycled from "on" to "off."

When the BCM 12 goes into "sleep" mode, it removes the wake-up ground signal to the PSDM 14 causing it to also go into "sleep" mode. At all other times (e.g., when the wake-up ground signal is being applied by the BCM 12 to the PSDM 14) the PSDM 14 is in the operating mode.

The PSDM 14 communicates over the J1850 data bus 18 with the following other vehicle controls: the body control module 12, the electronic automatic transmission controller 28, and the single board engine controller 26. Through this interface, the PSDM 14 provides memory storage, instructions, and diagnostics. The PSDM 14 is operational when a wake-up (power-up) ground signal is received from the BCM 12, independent of the ignition switch 30 power.

The PSDM 14 drives three motors, the sliding door motor 48, the cinching motor 50 and the motor drive clutch 52. When a door activation request is broadcast from the BCM 12 over the J1850 data bus 18 to the PSDM 14, the PSDM 14 interprets the necessary inputs and outputs from the control modules, switches and sensors. Based on that information, the PSDM 14 makes a determination of whether to actuate the power sliding door motor 48 to open or close, as appropriate, or to neglect to actuate the power sliding door.

If the PSDM 14 detects an increase in door effort as the sliding door is being actuated, the PSDM 14 will suspect that there is an obstruction in the door's path and reverse the direction of travel of the sliding door. If two consecutive obstructions occur, the PSDM 14 shuts down and stalls the sliding door motor 48.

The power cinching motor 50 is controlled by the PSDM 14. During a sliding door close cycle, when the sliding door is almost closed, such as within about the last several millimeters of door travel, the PSDM 14 provides power to the cinching motor 50 to close the sliding door into a primary "closed" position.

The PSDM 14 also controls the motor drive clutch 52. When a power sliding door activation request is sent from the BCM 12 via J1850 data bus 18 to the PSDM 14, the PSDM 14 again interprets the necessary inputs and outputs from the control modules, switches and sensors. Based on that information, the PSDM 14 makes a determination of whether or not to actuate the motor drive clutch 52 to operate the sliding door gear mechanism.

The PSDM 14 receives speed pulse and battery voltage level inputs over the J1850 data bus 18 from the SBEC 26. The PSDM 14 also receives gear position park-reverse-neutral-drive-low (PRNDL) information over the J1850 data bus 18 from the EATX 28.

In addition, the PSDM 14 monitors switches and sensors for state conditions, whose data are utilized to determine if and when sliding door operations are initiated and carried out by the PSDM 14.

The sliding door handle switch 38 is a low current switch to ground that is activated when a vehicle occupant manually operates either the interior or exterior sliding door handles. When the PSDM 14 receives a ground signal input from the door handle switch 38, this indicates a request of the PSDM 14 to disengage the motor drive clutch 52 and turn off the sliding door motor 48. This feature allows a user to stop the powered activation of a sliding door if desired, such as in the case of an emergency situation. The control system 10 still enables the power sliding doors to be fully manually operational from the interior and exterior door handles.

The end of travel switch 42 is a low current switch to ground that is activated when the power sliding door is fully open. When the PSDM 14 receives a signal input from the end of travel switch 42, the PSDM 14 stops the sliding door open motion and shuts down the sliding door motor 48.

The child lock switch 40 is a low current switch to ground that is activated when the child lock safety feature on the door is engaged. When the PSDM 14 receives a ground signal input from a child lock switch 40, the PSDM 14 subsequently disregards power sliding door activation requests originating from the corresponding sliding door's B-pillar switch 22. However, activation requests from all other switches and the RKE system 24 remain valid. This feature provides an additional safety function for children occupants of the vehicle.

The primary and secondary latch switches 32, 34 are low current switches to ground that are associated with the physical position of the sliding doors. When the PSDM 14 receives a ground signal input from a primary latch switch 32, the PSDM 14 stops and shuts down the power cinching motor 50. When the input from a secondary latch 34 is grounded, the PSDM 14 disengages the sliding door drive motor 48 and activates the cinching motor 50. Obstructions to the travel of the power sliding door in between the secondary 34 and primary 32 latch positions are detected with a tape switch 44, as discussed further herein. The primary and secondary latch switches 32, 34 are cooperable with a ratchet and pawl mechanism on the sliding door to determine whether the sliding door latch is open or closed.

The BCM 12 receives door ajar status from the primary latch switch which is hardwired to the BCM 12.

The lock switch 36 is a low current switch to ground that is activated when the sliding door lock is in the "locked" position. When the PSDM 14 receives a ground signal input from a lock switch 36, the PSDM 14 reads the lock switch 36 status and determines whether or not to operate the power door in response to a door activation request. If the door is locked, the PSDM 14 will not activate the sliding door motor 48 to operate the door on a B-pillar switch 22 activation. In that case, the door has to be in an unlocked state to operate. However, a sliding door activation request received from the overhead console switch 20 or the RKE system 24 will initiate a sliding door activation because upon RKE system 24 actuation, the BCM 12 first unlocks the door and then broadcasts a message to the PSDM 14 to actuate the power sliding door. This prevents the sliding door motor 48 from becoming damaged due to trying to open a locked door.

The tape switch 44 is an analog current switch to ground which is activated when an obstruction blocks travel of the power sliding door during its actuation. When the PSDM 14 receives an analog signal input from the tape switch 44, the PSDM 14 instructs the sliding door motor 48 and/or cinching motor 50 to first stop and then reverse the direction of travel of the power sliding door that is obstructed.

The PSDM 14 drives the Hall effects sensor 46. The PSDM 14 monitors and controls the position and speed of the door motion by providing power to the Hall effects sensor 46.

As already mentioned, the power sliding door control system 10 utilizes several user-operated input mechanisms for initiating sliding door activation requests. These input mechanisms are overhead console switches 20, B-pillar switches 22 and a remote keyless entry (RKE) system 24.

The overhead console switches 20 provide the vehicle occupants with switches for activation of power sliding doors and/or liftgate accessories or the ability to lock-out the interior switches 20, 22. The overhead console switches 20 are low current and have resistance values to indicate open and short circuit conditions. The overhead console switches 20 have four switch combinations: left sliding door, right sliding door, liftgate, and lockout. Each sliding door or liftgate switch is momentary and the lockout feature is a latching switch. If the lockout feature is enabled, all the interior switches, including both the overhead console switches 20 and the B-pillar switches 22 are disabled. The user then must disable the lockout feature to regain use of the interior switches 20 22.

The user selects an overhead console switch 20 function by means of a resistive multiplexed signal to the BCM 12. The BCM 12 broadcasts a message over the J1850 data bus 18 to the PSDM 14 to actuate the vehicle accessory function selected by the user. Upon the press of an overhead console switch 20, the BCM 12 receives the switch input and broadcasts a message to the PSDM 14 indicating the button had been pressed.

The B-pillar switches 22 provide the vehicle occupants with a switch for a power sliding door activation request. Depending upon the configuration of the vehicle, there are either one or both of two B-pillar switches, a left B-pillar switch and a right B-pillar switch. The B-pillar switches 22 are low current switches that possess resistance values to indicate open and short circuit conditions. The B-pillar switches 22 are hardwired directly to the BCM 12. When the user selects a B-pillar switch 22 function, the BCM 12 broadcasts a message to the PSDM 14 over the J1850 data bus 18 indicating that a button has been pressed.

The RKE system 24 is, itself, a vehicle convenience accessory that is intended to allow a user to avoid having to manually operate a key in a mechanical lock mechanism to open a sliding door or liftgate by enabling the user to remotely access a vehicle from a short distance away from the vehicle. The RKE system 24 generally comprises a transmitter 56 and a receiver 58.

The transmitter 56 is usually packaged in a small, handheld fob that also serves as a key chain. The transmitter 56 of the present invention includes six input switches or input buttons 60. Interface of the RKE transmitter 56 to the vehicle and, consequently, to the power sliding door control system 10, is by radio frequency (RF) transmissions to the RKE receiver 58. Of course, the transmission signal can be at other conventionally used frequencies, such as the infrared, as one example. Upon selection and activation of an input button 60, the RKE transmitter 56 transmits a radio frequency signal to a RKE receiver 58 located in the vehicle's electrical system. The RKE receiver 58 can employ any of a number of well-known radio frequency reception technologies, such as super-heterodyne technology as one example. In the RKE receiver 58, the transmissions are received, interpreted and translated into specific messages. The messages are then sent from the RKE receiver 58 to the BCM 12 by a serial data link.

Included in the functions of the RKE system 24 are the locking and unlocking of the doors of the vehicle, locking and unlocking of the liftgate, opening and closing of the power sliding doors, opening and closing of the power liftgate, and a "panic" mode. Also, operator programmable features may be incorporated in the RKE transmitters 56, such as the sounding of a horn chirp, unlocking all the doors of the vehicle on a first button press or alternatively unlocking only the driver's side doors on a first button press and all the doors of the vehicle on a second button press; recalling operator stored preferences associated with other vehicle convenience accessory systems (if the vehicle is so equipped), such as preprogrammed seat and mirror locations. The overhead console 20 lockout feature has no effect on RKE system 24 operation.

In addition, the RKE system 24 initiates feedback to the operator in the manner of, for example, flashing lights, to readily confirm to the operator from a distance that the RKE system 24 is operating according to the operator's input requests.

The RKE system 24 components are preprogrammed for an individual vehicle prior to installation of the RKE system 24 during the manufacture of the vehicle. However, the RKE system 24 may likewise be programmed at the vehicle assembly plant or by a service facility.

The PLGM 16 communicates over the J1850 data bus 18 with the BCM 12. The PLGM controls the power liftgate actuation upon via electric motors located at or near the liftgate.

The method of operation of the control system 10 of the present invention is explained as follows. While in the normal operating mode (e.g., an awake state), the BCM 12 monitors the overhead console switches 20, the B-pillar switches 22 and the RKE system 24 for a change of state. Upon a successful switch activation from either the overhead console switches 20 or the B-Pillar switches 22, the BCM 12 broadcasts a message over the J1850 data bus to the PSDM 14 indicating that there has been a sliding door activation request.

After receiving the activation request message from the BCM 12, the PSDM 14 makes a determination of what action in response to the message will take place. The PSDM's 14 determination is based upon the state of the several vehicle systems and conditions that the PSDM 14 either controls or monitors; that is, the PSDM 14 determines that it will respond to the message and how it will respond or that it will deliberately ignore the message based upon the state of the vehicle at that time. If the PSDM 14 determines that the sliding door activation request (e.g., open or close) will be carried out, it broadcasts an in-frame response back to the BCM 12. When the BCM 12 receives the PSDM's 14 response, the BCM 12 causes a chime 54 to ring three times to thereby indicate to the vehicle occupants that a sliding door is operating (e.g., opening or closing, as the case may be).

Should multiple power sliding door and/or power liftgate opening or closing requests be made in quick succession by the user, the PSDM 14 is operable to undertake the requests at a staggered time interval, thus preventing a possible overload condition in the vehicle electronics.

The PSDM 14 reads inputs from the following switches and sensors: the primary latch switch 32, the secondary latch switch 34, the child lock switch 40, the end of travel switch 42, the lock status switch 36, the sliding door handle switch 38 and the Hall effects sensor 46. The PSDM 14 then enables the vehicle components (e.g., the power sliding door motors and drive clutch 48, 50, 52) necessary to open, close or inhibit operation of the sliding door as required.

The vehicle sliding door must be unlocked in order to open in response to a sliding door activation request initiated from the B-pillar 22 switches. For example, if the BCM 12 broadcasts a message to the PSDM 14 corresponding to an activation request from the B-pillar switches 22 for a power sliding door that is closed and locked, the PSDM 14 reads the lock switch 36 input that the door is locked. Subsequently, the PSDM 14 inhibits any attempt to open the sliding door.

According to the method of the present invention, however, the foregoing does not hold true with respect to sliding door activation requests initiated by either the overhead console 20 or the RKE system 24. In the case of a sliding door activation request that is initiated by either the overhead console 20 or the RKE system 24, the BCM 12 first insures that the selected sliding door is unlocked. The BCM 12 reads the input from the primary latch switch 32 to determine if the sliding door is closed or ajar. If the primary latch switch 32 indicates that the door is closed, the BCM 12 activates the door lock motor 60 on that door's side of the vehicle to insure that the door is unlocked. If the primary latch switch 32 indicates that the door is ajar, no such door lock motor activation is initiated. The BCM 12 then broadcasts the sliding door activation request message to the PSDM 14 as previously described. Again, the PSDM 14 determines if the action requested is to be carried out.

The power sliding door control system 10 is disabled during engine cranking. If a power sliding door is in motion at the time the engine is cranking, motion of the door ceases until after engine cranking, at which time it is then resumed.

If the BCM 12 reads that the lockout switch of the overhead console 20 is enabled, the BCM 12 prohibits delivery of accessory activation messages to the PSDM 14 that originate from either the overhead console switches 20 or the B-pillar switches 22. However, enabling of the overhead console 20 lockout switch does not inhibit operation of the RKE system 24 and power door activation messages to the BCM 12 originating from the RKE receiver 58 are broadcast to the PSDM 14 to be carried out.

The PSDM 14 reads the ignition switch 30 status from the BCM 12 over the J1850 data bus 28. The ignition switch status can include "on," "off" and "steering column unlock." When the ignition is on, and the EATX 28 broadcasts on the J1850 data bus 18 that the automatic transmission is in a position other than park or neutral, the PSDM 14 does not allow the power sliding door(s) to be opened. If the transmission is in park or neutral, the PSDM 14 enables the power sliding door(s) to open, provided that the distance pulses being transmitted by the SBEC 26 indicate that the vehicle is not moving. If the door is already in the full open position when the vehicle is shifted out of park or neutral or the vehicle speed is caused to be greater than zero, the PSDM 14 inhibits operation of the power sliding door so that the door remains in the full open position. However, if the door is in the process of opening under power, and the vehicle is shifted out of park or neutral or the vehicle speed is caused to be greater than zero, the PSDM 14 inhibits operation of the power sliding door so that the door reverses and powers close. If the door is in the process of closing under power when the vehicle is shifted out of park or neutral or the vehicle speed is caused to be greater than zero, the PSDM 14 allows operation of the power sliding door to continue so that the door powers close.

The PSDM 14 also inhibits the left power sliding door from opening during fueling by using a conventional mechanical lock mechanism.

Operation of the power sliding door control system 10 by input from the RKE system 24 is described as follows. By depressing the appropriate button on the RKE transmitter 56, the user initiates actuation of a power sliding door function via the RKE system 24. The RKE transmitter 56 transmits the actuation request which is received by the RKE receiver 58. The RKE receiver 58 decodes a transmitted message (e.g., in the form of a serial data string) from the RKE transmitter 56. Upon determining that the RKE transmitter 56 is validly programmed to the RKE receiver 58, the RKE receiver 58 sends a serial data stream message to the BCM 12. The data stream message can take a well-known form, such as a modulated signal comprising a wake-up signal, the output function desired to be performed, and a transmitter identification, for example. The RKE receiver 58 is capable of learning up to four individual transmitter vehicle access codes (VACs) and will store them in its EEPROM memory during its programming mode.

The BCM monitors the states of the ignition switch and the vehicle transmission via the J1850 data bus. When the ignition is in the "on" position and the vehicle is not in park, as indicated by the the EATX, the BCM may inhibit the activation of the power sliding doors and power liftgate functions initiated by an actuation input from the RKE system. Also, the RKE system functions are inhibited by the BCM if the ignition switch is in the "steering column unlock" position and no status communications are detected by the BCM from the EATX.

The function of the six input buttons 60 included on the RKE transmitter 56, can generally be categorized as LEFT, RIGHT, LIFTGATE, UNLOCK, LOCK and PANIC. Greater detail is provided in the table below.

| RKE Function | Button(s) Depressed |
|---|---|
| Unlock Driver's Side Doors | Unlock (Pressed Once) |
| Unlock All Doors & Liftgate | Unlock (Pressed Twice within 5 seconds) |
| Lock All Doors & Liftgate | Lock (Pressed Once) |
| Unlock Left Side Doors and Open Power Sliding Door if Closed; or Close Power Sliding Door if Open | Left (Pressed Once) |
| Unlock Right Side and Open Power Sliding Door if Closed; or Close Power Sliding Door if Open | Right (Pressed Once) |
| Unlock Lift Gate and Open Power Liftgate if Closed; or Close Power Liftgate if Open | Liftgate (Pressed Once) |
| Panic Mode | Panic |

All the vehicles manufactured, however, do not have the identical convenience accessory options. For example, in a minivan, the potential accessory options include left and/or right side power sliding doors and/or a power liftgate. Since the RKE system of the present invention is intended to accommodate all the various combinations of power sliding door and power liftgate options as well as other accessories common to all vehicles, such as power locks, horn, lights and panic alarm, each input button 60 performs a logical operation on the vehicle, despite the combination of convenience accessories that it possesses. Consequently, in the absence of a power sliding door on either the left or right side of the vehicle, the LEFT and RIGHT input buttons 60 will merely operate to unlock doors on the left and right sides of the vehicle, respectively. Similarly, with respect to the power liftgate accessory, if this feature is not included on the vehicle, the LIFTGATE input button 60 will only unlock the liftgate.

The present invention has been described in an illustrative manner. It should be understood that the terminology which has been used is intended to be in the nature of words of description rather than of limitation. Many modifications or variations to the present invention are possible in light of the above teachings. Therefore, within the scope of the following claims, the present invention may be practiced otherwise than as specifically described.

What is claimed is:

1. A method for controlling the operation of at least one power sliding door and a power liftgate in a minivan, said method comprising:

providing a RKE system user input interface comprising a RKE transmitter and a RKE receiver;

monitoring said RKE system for a change of state in a first control module;

producing an actuation signal in response to a user request in said RKE system;

receiving said actuation signal from said RKE system in a first control module;

interpreting said actuation signal in said first control module;

determining an action in response to said actuation signal in said first control module comprising monitoring status inputs from an ignition switch and monitoring gear position information from a transmission controller;

broadcasting an actuation message by said first control module;

receiving an actuation message from said first control module in a second control module; and directing the movement of at least one of said at least one power sliding door and said power liftgate in a second control module utilizing at least one electric motor.

2. The method of claim 1 wherein said one of said plurality of output functions is selected from the group comprising:
   opening a right power sliding door;
   closing a right power sliding door;
   opening a left power sliding door;
   closing a left power sliding door;
   opening said power liftgate; and
   closing said power liftgate.

3. The method of claim 1 wherein said determining an action in response to said actuation signal in said first control module is comprising unlocking said at least one sliding door when an actuation signal is received from said RKE system.

4. The method of claim 1 wherein said determining an action in response to said actuation signal in said first control module is further comprising:
   disregarding an activation input originating from said RKE system when a first status input is received from said ignition switch and said gear position monitored from said transmission controller indicates that said minivan is not in park.

5. The method of claim 1 wherein said determining an action in response to said actuation signal in said first control module is further comprising:
   disregarding an activation input originating from said RKE system when a second status input is received from said ignition switch and no gear position information is monitored from said transmission controller.

6. The method of claim 1 wherein said directing the movement of either said power sliding door or said power liftgate is comprising at least one of the following:
   opening said at least one power sliding door;
   closing said at least one power sliding door;
   opening said power liftgate; and
   closing said power liftgate.

7. The method of claim 1 wherein said directing the movement of either said power sliding door or said power liftgate is comprising at least one of the following:
   opening a right power sliding door;
   closing a right power sliding door;
   opening a left power sliding door; and
   closing a left power sliding door.

8. A method for controlling the operation of at least one power sliding door and a power liftgate in a minivan, said method comprising:
   providing a RKE system user input interface comprising a RKE transmitter and a RKE receiver, said RKE transmitter comprising a plurality of input switches, said input switches comprising an unlock switch, a lock switch, a left doors switch, a right doors switch, a liftgate switch and a panic switch, and wherein said RKE transmits a radio frequency signal to said RKE receiver;
   monitoring said RKE system for a change of state in a first control module;
   producing an actuation signal in response to a user request in said RKE system;
   receiving said actuation signal from said RKE system in a first control module;
   interpreting said actuation signal in said first control module;
   determining an action in response to said actuation signal in said first control module comprising monitoring status inputs from an ignition switch, monitoring gear position information from a transmission controller, and disregarding an activation input originating from said RKE system when a first status input is received from said ignition switch and said gear position monitored from said transmission controller indicates that said minivan is not in park;
   broadcasting an actuation message by said first control module;
   receiving an actuation message from said first control module in a second control module; and
   directing the movement of at least one of said at least one power sliding door and said power liftgate in a second control module utilizing at least one electric motor.

9. The method of claim 8 wherein said one of said plurality of output functions is selected from the group comprising:
   opening a right power sliding door;
   closing a right power sliding door;
   opening a left power sliding door;
   closing a left power sliding door;
   opening said power liftgate; and
   closing said power liftgate.

10. The method of claim 8 wherein said determining an action in response to said actuation signal in said first control module is comprising unlocking said at least one sliding door when an actuation signal is received from said RKE system.

11. The method of claim 8 wherein said directing the movement of either said power sliding door or said power liftgate is comprising at least one of the following:
    opening said at least one power sliding door;
    closing said at least one power sliding door;
    opening said power liftgate; and
    closing said power liftgate.

12. The method of claim 8 wherein said directing the movement of either said power sliding door or said power liftgate is comprising at least one of the following:
    opening a right power sliding door;
    closing a right power sliding door;
    opening a left power sliding door; and
    closing a left power sliding door.

13. A method for controlling the operation of at least one power sliding door and a power liftgate in a minivan, said method comprising:
    providing a RKE system user input interface comprising a RKE transmitter and a RKE receiver, said RKE transmitter comprising a plurality of input switches, said input switches comprising an unlock switch, a lock switch, a left doors switch, a right doors switch, a liftgate switch and a panic switch, and wherein said RKE transmits a radio frequency signal to said RKE receiver;
    monitoring said RKE system for a change of state in a first control module;
    producing an actuation signal in response to a user request in said RKE system;
    receiving said actuation signal from said RKE system in a first control module;
    interpreting said actuation signal in said first control module;
    determining an action in response to said actuation signal in said first control module comprising monitoring status inputs from an ignition switch, monitoring gear position information from a transmission controller, and disregarding an activation input originating from said RKE system when a second status input is received from said ignition switch and no gear position information is monitored from said transmission controller;

broadcasting an actuation message by said first control module;

receiving an actuation message from said first control module in a second control module; and directing the movement of at least one of said at least one power sliding door and said power liftgate in a second control module utilizing at least one electric motor.

14. The method of claim 13 wherein said one of said plurality of output functions is selected from the group comprising:

opening a right power sliding door;

closing a right power sliding door;

opening a left power sliding door;

closing a left power sliding door;

opening said power liftgate; and closing said power liftgate.

15. The method of claim 13 wherein said determining an action in response to said actuation signal in said first control module is comprising unlocking said at least one sliding door when an actuation signal is received from said RKE system.

16. The method of claim 13 wherein said directing the movement of either said power sliding door or said power liftgate is comprising at least one of the following:

opening said at least one power sliding door;

closing said at least one power sliding door;

opening said power liftgate; and closing said power liftgate.

17. The method of claim 13 wherein said directing the movement of either said power sliding door or said power liftgate is comprising at least one of the following:

opening a right power sliding door;

closing a right power sliding door;

opening a left power sliding door; and closing a left power sliding door.

* * * * *